(12) United States Patent
Schwartz

(10) Patent No.: US 9,349,409 B1
(45) Date of Patent: May 24, 2016

(54) VIDEO DATA ORGANIZATION

(71) Applicant: Amazon Technologies, Inc., Reno, NV (US)

(72) Inventor: Benjamin M. Schwartz, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 709 days.

(21) Appl. No.: 13/645,379

(22) Filed: Oct. 4, 2012

(51) Int. Cl.
*H04N 5/84* (2006.01)
*H04N 5/89* (2006.01)
*G11B 7/007* (2006.01)
*G06Q 30/06* (2012.01)

(52) U.S. Cl.
CPC ........ *G11B 7/00736* (2013.01); *G06Q 30/0601* (2013.01)

(58) Field of Classification Search
USPC .................................................. 386/334–336
See application file for complete search history.

(56) References Cited

U.S. PATENT DOCUMENTS

| | | | |
|---|---|---|---|
| 6,424,614 B1 * | 7/2002 | Kawamura et al. | 369/275.3 |
| 2006/0218604 A1 * | 9/2006 | Riedl et al. | 725/91 |
| 2008/0152323 A1 * | 6/2008 | Hora | 386/126 |
| 2009/0074388 A1 * | 3/2009 | Hashimoto et al. | 386/126 |
| 2009/0144763 A1 * | 6/2009 | Hurst et al. | 720/718 |

* cited by examiner

*Primary Examiner* — Nigar Chowdhury
(74) *Attorney, Agent, or Firm* — Thorpe North & Western LLP

(57) ABSTRACT

In organizing video data, an analysis can be performed to determine whether the video data meets specifications for organization on storage media. Potential breaks in the video data may be identified for organizing the video data on discrete physical portions of the storage media. A buffer space may be calculated based on an identified potential break for spacing the video data around the potential break to meet the data organization specifications.

24 Claims, 8 Drawing Sheets

VIDEO DATA ORGANIZATION

BACKGROUND

Optical discs, such as DVDs, are commonly used for storing data and viewing video content. Optical discs provide the ability to reproduce moving pictures and sound, and provide durability and interactivity. Optical discs are commonly provided with one or more layers to which data may be recorded. Data may be recorded on a spiral track on the optical disc. The data may comprise a lead-in area, a data area, and a lead-out area. The data area may include a volume descriptor which identifies the structure and contents of the data area, together with one or more tracks.

The DVD specification was adopted by movie and home entertainment distributors as a technology for distributing movies to customers in the home entertainment marketplace. Pre-recorded DVDs are mass-produced using molding machines that physically stamp data onto the DVD. Such discs are known as DVD-ROMs (DVD-Read Only Memory), because data may be read but not written or erased. Blank recordable DVD discs (DVD-R and DVD+R) may be recorded once using a DVD recorder and then function as a DVD-ROM. DVD-Download discs provide CSS (Content Scramble System) managed recordings with a similar capacity as DVD-ROM or DVD-R discs. DVD-Download discs may be used for manufacturing DVDs on demand using similar copy protection schemes as are used on commercial DVDs.

DETAILED DESCRIPTION

A technology is provided that enables organization of video data across storage media. For example, video data may be targeted for storage on multiple storage devices, or on multiple layers, multiple locations, multiple substrates or the like of one storage device, such as an optical disc. Video data may be analyzed to determine whether the video data already meets specifications for organization on storage media. When the video data fails to meet the specifications, potential breaks in the video data may be identified for organizing the video data on discrete physical portions of the storage medium. A buffer space may be calculated based on an identified potential break. The buffer space may be for moving, pushing or otherwise spacing the video data around the potential break to meet the data organization specifications. More specifically, the buffer space can offset a position of the video data on the storage medium to meet the data organization specifications. Inclusion of the buffer space can result in repositioning of portions of the video data on different discrete physical portions of the storage medium.

The technology may be applied, for example, in the context of internet sales of DVD-based videos. When a customer chooses to purchase a video, the video may be provided for download to the customer as a dual layer DVD-Download disc image. Alternately, or in addition, the video may be recorded to a dual layer DVD-Download disc and shipped to the customer. In these scenarios a DVD author typically authors a dual layer DVD image for stamping to dual layer DVD-ROMs and a separate dual layer DVD image for DVD-Download discs because various incompatibilities regarding positioning of the break between layers may exist between layer break specifications for stamped multi-layer DVDs and layer break specifications for multi-layer DVD-Download discs. The present technology enables the use of data (such as files) from the DVD-ROM image to be modified, such as by moving data before or after the layer break, to create a DVD-Download disc image. In other words, files from the DVD-ROM may be organized and positioned in a DVD image to fit DVD-Download specifications.

Figure 1A:
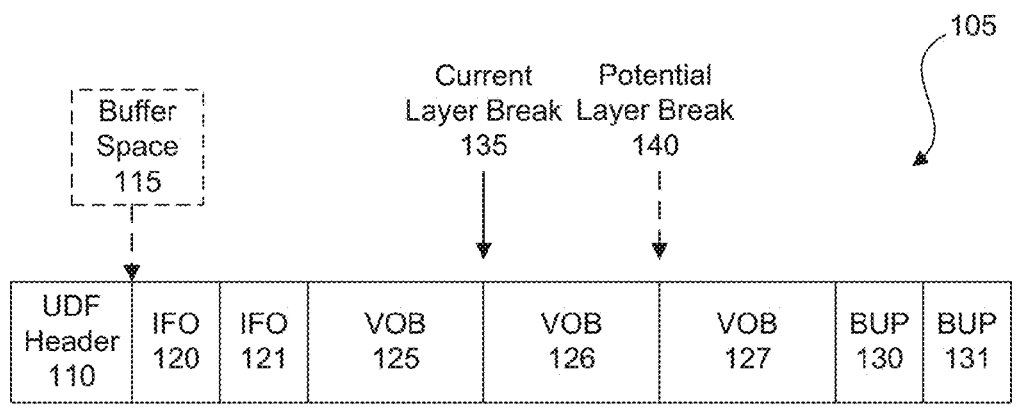
FIGS. 1a-1b illustrate use of a buffer space with video data to organize the video data in accordance with an example of the present technology.

As shown in FIG. 1a, for example, a DVD-ROM image including video data 105 may have an organization which may be unsuitable for DVD-Download standards. For example, a current layer break 135 of a DVD-ROM may be unsuitable for DVD-Download. Therefore, potential layer breaks 140 or break points may be identified for rearranging or reorganizing the data to meet DVD-Download standards. A buffer space 115 may be calculated for insertion into a disc image with the video data to position a potential layer break 140 to meet the DVD-Download standards. In a specific example, the buffer space 115 may be inserted near a beginning of a first layer of a multi-layer DVD disc.

With continued reference to FIG. 1a, video data 105, such as data "ripped" or copied from a stamped DVD image is illustrated. The blocks of data or sections of the DVD, including the UDF Header 110 (Universal Disc Format file system Header), IFO 120-121 (Information files), VOB 125-127 (Video Object files) and BUP 130-131 (Backup files) portions, are simplified for illustration purposes and do not necessarily represent an actual organization of files for a DVD. However, implementation of the technology with much more complex data structures is also contemplated.

The present technology may be used to facilitate Disc on Demand services where discs are manufactured on demand without storage of inventory. When a customer purchases a video, the video data configured for DVD-Download may be provided for recording to a DVD+/−R, and in some examples may be shipped with materials, packaging, and the like which may also be manufactured on demand. Because stamped DVD images may be used as a basis for creating DVD-Download images, a greater number of videos may be made available to customers in the on-demand model by converting stamped DVD images to DVD-Download images. Otherwise there may be a limited number of situations where the author of video content creates both a stamped image and a DVD-Download image.

Dual layer DVDs contain a second data layer that allows the DVD to hold twice as much data as a single layer DVD. High capacity optical discs may have two or more information layers that may be read with a laser beam. The read head focuses the beam on one of the two information layers. Each information layer may be a reflective coating that modulates and reflects the laser beam. The information layer closest to the side of the disc where the read head is positioned may have a semi-reflective coating. When the laser beam is focused on this layer, sufficient light is reflected to allow the data on this layer to be read. The information layer that is remote from the side of the disc where the read head is positioned may have a fully reflective coating. When the laser beam is focused on the remote or second layer, light that passes through the semi-reflective layer may be modulated and reflected by the fully reflective layer and may pass through the semi-reflective layer again. Many stamped DVDs are dual layer DVDs. As a result, DVD Download discs may also be dual layer DVDs to accommodate the data included in the stamped dual layer DVDs.

Various specifications for splitting the data across layers exist for creating dual layered content for video. When burning dual layer content on DVD Download discs (i.e., DVD+R discs with CSS), the layer break position 135/140 is even further restricted, or rather additional specifications exist for defining how the data is split across the layers.

Vendors or authors of stamped DVDs may invest a significant amount of time and money authoring the stamped DVDs. Re-authoring the stamped DVDs for DVD Download discs by the vendors may result in additional time and money spent-particularly if the vendor is to re-author a large library of DVDs. As part of a Disc on Demand business, a merchant may wish to accept dual layer content from vendors which was not authored specifically for DVD Download discs. The merchant may convert the dual layer content to comply with DVD Download specifications to more efficiently manage inventories and to more efficiently provide a variety of DVDs to the customer. While some dual layer content fits the specifications for DVD download discs, in many instances the dual layer content does not fit the DVD Download specifications. The present technology may test the dual layer content to determine the content's compliance with the DVD Download specifications and may modify the dual layer content for recording to DVD Download discs without re-authoring by the vendor.

As shown in FIG. 1a, a current layer break 135 may exist for dual layer content received from the vendor. However, when the current layer break 135 does not arrange the dual layer content suitably for DVD download, one or more other potential layer breaks 140 may be identified. To determine whether the dual layer content is arranged suitably for DVD Download, various aspects of the arrangement of the dual layer content may be considered.

The following are some non-limiting examples of dual layer content arrangement stipulations or specifications which may be considered. For example, more data is to be stored on a first layer of the disc than a second layer. In addition, each layer of 120 mm (millimeter) DVD discs is capable of storing approximately 4.7 gigabytes (GB) of data. Because dual layer content is not typically exactly 9.4 gigabytes of data (or 8.5 gigabytes which is the current standard data storage capacity for single-sided (SS) dual-layer (DL) DVD+R and DVD-R discs), based on the specification the second layer will typically include less than 4.7 gigabytes of data so as to include less data than the first layer.

While describing some of the additional specifications for recording dual layer content to DVD Download discs, a discussion of some of the aspects of DVD structure will be also provided as a basis for understanding the additional specifications. The specifications described below may be related to the following categories:

I. Comparative storage of the first and second layers;
II. Layer break points at specifically numbered sectors;
III. Layer break points at cell boundaries; and
IV. Layer break points at the beginning of specified files.

I. Comparative Storage of the First and Second Layers

Manufacturers express disc capacity in terms of how much computer data a disc may contain. For example, DVD-R (General), DVD-R (Authoring), DVD+R, DVD+RW (DVD+Re-Writable) and DVD-RAM (DVD-Random Access Memory) discs are available in 4.7 GB single and 9.4 GB double-sided (12 cm (centimeter)), and 1.46 GB single and 2.92 GB double-sided (8 cm) sizes, as well as dual layer varieties, such as the 8.5 GB single-sided dual layer 12 cm disc or the 17 GB dual-sided dual layer 12 cm disc. The amount of information that may be written on the disc is determined by the disc's recording capacity as well as the physical and logical formats used for the disc.

Writable DVD formats provide a standard amount of usable space to data-2,048 bytes per sector. DVD+R, DVD+RW and DVD-RAM specify the number of sectors available for user information. For example, 1.46 GB DVD+R/+RW discs include 714,544 sectors available for user information, 4.7 GB DVD+R/+RW discs include 2,295,104 sectors available for user information, 1.46 GB DVD-RAM discs include 714,480 sectors available for user information, 2.6 GB DVD-RAM 1,218,960 include sectors available for user information, and 4.7 GB DVD-RAM discs include 2,295,072 sectors available for user information. Disc capacity may be calculated by multiplying the user data area size by the number of disc sectors. Using a 4.7 GB DVD+R disc as an example, 2,048 bytes/sector*2,295,104 sectors=4,700,372,992 bytes, which is roughly the noted 4.7 GB capacity.

Some of the specifications for DVD Download discs may include the specification that the first layer has more sectors with data than the second layer. More specifically, the first layer may have at least 14,000 more sectors with data than the second layer, or even more specifically at least 14,080 more sectors with data than the second layer. As will be described in further detail later, data may be structured as IFO files 120-121, VOB files 125-127, BUP files 130-131, or other file types.

II. Layer Break Points at Specifically Numbered Sectors

Another specification may be that potential layer breaks 140 are restricted to locations of files starting at a sector numbered as a multiple of 16. If a potential layer break is identified with a sector numbered other than a multiple of 16, the buffer space 115 may be sized to offset the beginning of the file location to position the potential layer break 140 at a sector numbered as a multiple of 16. Additional details regarding this specification are described later regarding layer break points at the beginning of specified files in section IV.

III. Layer Break Points at Cell Boundaries

A video or a movie on a DVD often consists of many individual sequential segments of video scenes or video clips. In DVD terminology, an individual scene is called a cell. DVDs are typically authored such that a cell contains a segment of video or a scene. Accompanying audio may or may not be included in the cell. A cell may be the smallest element of a DVD project and may be a basic unit of playback of video and audio data. A cell is a unit of playback of data and may be uniquely identified by a set of numbers: cell ID (identification) (e.g., from 1 to 255) and VOB ID (e.g., from 1 to 65,535). A cell may be comprised of one or more Video Object Units (VOBU). Each VOBU consists of from 0.4 second to 1 second of playback time. VOBUs belonging to a same cell may have the same VOB ID and cell ID. Each VOBU begins with a navigation pack and is followed by one or more structures which contain video, audio, sub-picture, and other data in a packetized, time-division multiplexed fashion. The order of video, audio, and sub-picture stream in a VOBU is arbitrary.

A typical DVD program stream contains four packetized elementary streams (commonly abbreviated as "PES"): video, audio, sub-picture, and navigation. The navigation data stream contains the presentation control information (PCI), and data search information (DSI). A data stream may be as short as a few thousand bytes as in the case of a sub-picture stream, or as long as many gigabytes as in the case of a long movie. Data streams are stored in individual segments on DVD discs called sectors.

Each sector contains a total of 2064 bytes of raw data including a header area, user data area, and error detection code. The header area may include manufacturing and encryption information (used by the CSS). The usable 2048-byte data size is fixed and located between the sector header and the Error Detection Code (EDC). The EDC area contains information to help the DVD player make its best guess to correct or read from the data area if its contents are damaged. The data area holds the packetized elementary streams which make up the DVD contents. Logical sectors are recorded continuously on the DVD disc. A typical cell may span from one to many logical sectors.

Each cell is uniquely identified by its starting and ending sector address on the disc. A Program Chain (PGC) may define the order in which cells are played on a DVD player. One or more PGCs may be linked or chained together to form a video title (hence the term Program Chain). When there are more than one PGCs per title, one the PGCs is marked as a title-entry PGC. In simple movies with one PGC, the cells recorded on the disc are played in the same order as the cells in the PGC. A PGC keeps a count of the number of programs and cells present in the PGC. A PGC may be unaffected by inclusion of a buffer space or multiple buffer spaces at locations even other than near a beginning of a first layer.

Cells may be seamless and non-seamless. Whether a cell is seamless or non-seamless, a cell display implies one or more physical sectors on the DVD disc which include one video stream, up to eight audio streams, up to 32 sub-picture streams, and navigation information. Seamless cells are cells for continual flow of play of video content without noticeable delay or discontinuity, and may be flagged as seamless using cell attributes or properties. The first cell of any PGC is non-seamless by default and cannot have the seamless attribute.

A specification for layer breaks for DVD Download may include that the potential break 140 be at a non-seamless cell boundary. In other words, the potential layer break 140 may be positioned at a non-seamless cell boundary so that a transition between layers of the optical disc may be masked by the non-seamless transition from one cell to the next. While positioning of layer breaks on seamless cell boundaries may also be performed, the result may be a noticeable transition during video playback. Selection of a potential layer break at a first cell of a PGC may ensure that the layer break is at a non-seamless cell boundary.

IV. Layer Break Points at the Beginning of Specified Files

As described earlier, the dual layer content may consist of a variety of files and file types. IFO 120-121, VOB 125-127 and BUP 130-131 are some examples of common file types present on many DVDs. A VOB 125-127 may contain multiple data streams multiplexed together, such as video, audio and subtitle streams, for example. VOB files 125-127 may include MPEG-2 video files. A VOB 125-127 may contain a main video stream and one or more other multi-angle streams, enabling a user to switch the perspective during a movie, for example. A VOB file 125-127 may represent a DVD "chapter" or scene, such as may be accessible via a DVD menu. IFO (information) files 120-121 contain the information a DVD player uses to enable the user to navigate and play DVD content properly, such as where a chapter starts, where an audio or subtitle stream is located and information about menu functions and navigation. BUP (backup) files 130-131 are copies of IFO files 120-121, and may be used as a backup in case of corruption or inaccessibility of the IFO files 120-121, such as when a disc is scratched for example. IFO 120-121 and BUP files 130-131 are typically not encrypted while VOB files 125-127 are encrypted using CSS.

The present technology may be configured to identify potential layer breaks 140 at the beginning of a VOB 125-127, IFO 120-121 or BUP file 130-131. Alternately, potential layer breaks 140 may be identified by identifying the end(s) of VOB 125-127. IFO 120-121 or BUP files 130-131.

Potential layer breaks 140 may be identified at cell boundaries, as described previously. Many DVD filenames include an underscore numerical designation, such as "_0", "_1", "_2" and so forth. Some example filenames may include VTS_01_0.VOB, VTS_01_1.VOB and VTS_01_2.VOB. VOB files ending with "_0.VOB" contain menu assets. VOB files 125-127 with filenames ending in "_0" or "_1" designations begin on cell boundaries. VOB files 125-127 ending with other numerical designations of "_2" or greater are not guaranteed to begin on a cell boundary. To avoid possible layer breaks 140 in the middle of a cell, the present technology may restrict potential layer break location candidates to the beginning of "_0" or "_1" designated VOB files 125-127. As a result, the break between disc layers may be ensured to be at a cell boundary.

Figure 1B:
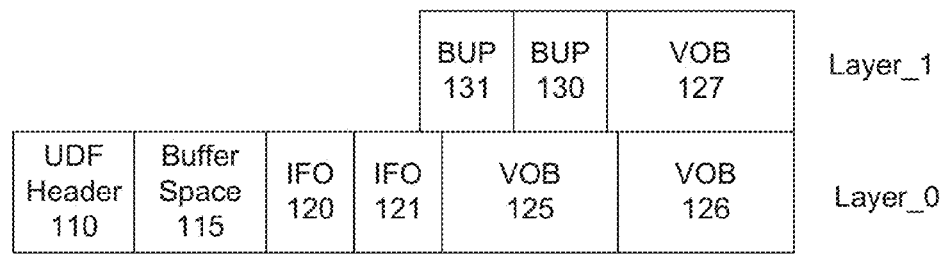

Referring now to FIG. 1*b*, an example implementation of the present technology is illustrated where a buffer space 115 has been included on a first layer (Layer_0) of a multilayer optical disc and the dual layer content is split between the first and second layers of the optical disc (i.e., between Layer_0 and Layer_1). A size of the buffer space 115 may be selected to offset a position of the video data (i.e., the IFO, VOB and BUP files) such that the layer break (i.e., potential layer break 140 of FIG. 1*a*) is positioned to meet the DVD Download authoring specifications described previously. Considering the specification that the layer break be positioned at a sector numbered as a multiple of 16 as an example, the buffer space 115 may be calculated to offset a potential layer break 140 (FIG. 1*a*) not already positioned at a sector numbered as a multiple of 16 by a number of sectors sufficient to position the potential layer break at a sector numbered as a multiple of 16. As a specific example, where the potential layer break is at a sector numbered as a multiple of 16 plus five additional sectors (e.g., at sector number 2,063,877=(128,992*16)+5), the buffer space 115 may include eleven sectors to position the potential layer break at a multiple of 16 (e.g., at sector number 2,063,888=2,063,877+11). However, many examples may be more complex when considering the multiple specifications for the DVD Download recording. VOB files 125-127 may each contain up to 1 GB (1,073,741,824 bytes) of data. Because each sector may include up to 2,048 bytes of data, a gigabyte may include up to 524,288 sectors. If a layer break is to be positioned at the beginning of a VOB file 125-127 which may otherwise be positioned to overlap or straddle the layer break, the buffer space 115 may comprise anywhere from 1 to 524,287 sectors to properly position the VOB file 125-127, which number may be further modified to position the potential layer break 140 at a sector numbered as a multiple of 16. The arrangement or organization of the data across the layers may include providing a buffer space 115 that positions multiple VOB 125-127 or other files on the second layer (Layer_1), resulting in buffer space sizes which may be greater than the number of sectors used for any individual data file.

Figure 2:
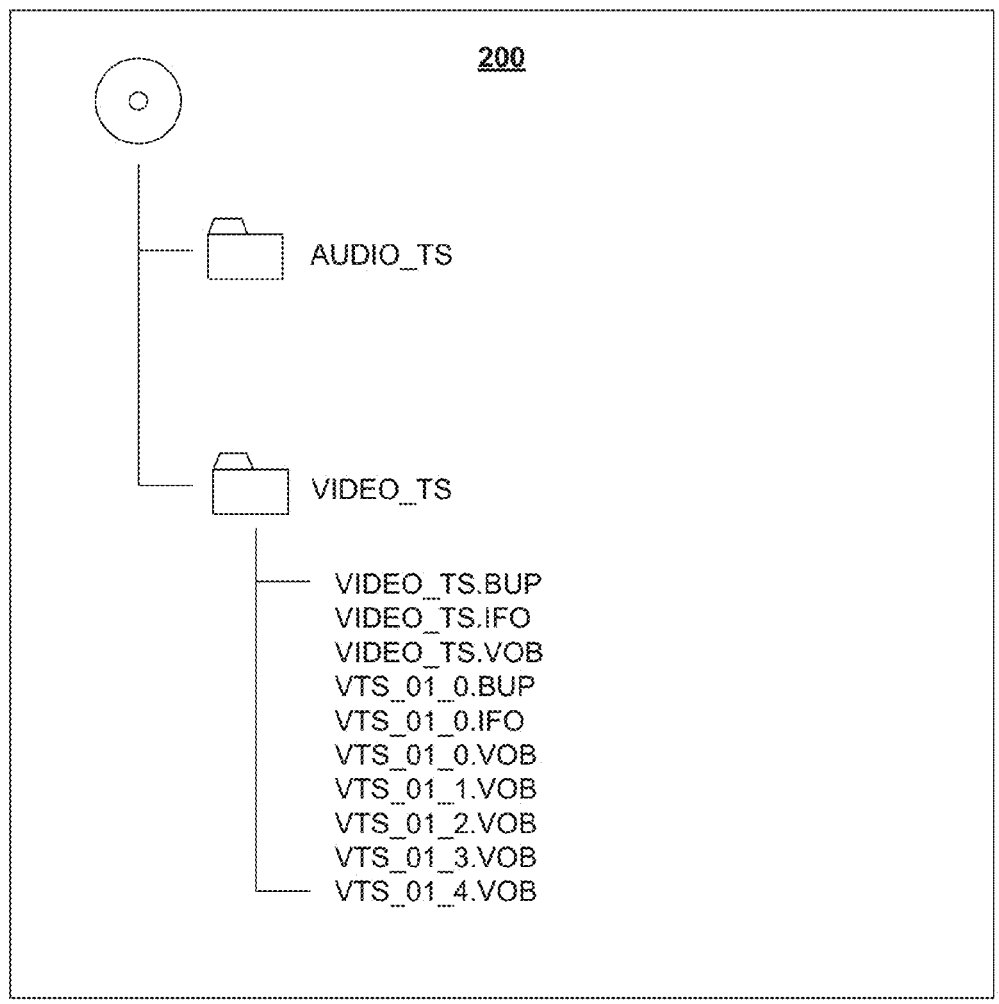
FIG. 2 is an example of a DVD file system.

In one example, the buffer space 115 may be a blank or unrecorded section of an optical disc or an optical disc image, or rather, the buffer spacer 115 may include zeroes, null values or otherwise empty sectors. The buffer space may be created using the UDF file system header 110. The UDF (Universal Disk Format) Header 110 indicated in FIG. 1*b* represents the file system for file layout on an optical disc. Disc authoring software may master a UDF file system header 110 in a batch process and write the UDF file system header to optical media in a single pass. An example UDF file system 200 is illustrated in FIG. 2. When packet writing to rewriteable media, such as DVD-RW, the UDF file system 200 may allow files to be created, deleted and changed on-disc similarly as a general-purpose file system may allow on other storage media such as hard drives, flash drives, solid state drives, floppy disks and the like. The UDF file system 200 may also allow creation, deletion or modification of files on write-once media, such as DVD-R, but the space occupied by the deleted files cannot be reclaimed and becomes inaccessible. In such an example, a buffer space 115 may be calculated based on inclusion of the unreclaimable or inaccessible sectors.

The UDF file system 200 may include a table identifying the location and length of files. For example, the table may indicate that file VTS_01_2.VOB begins at sector 1,245,037 and is 302,556 sectors long. A DVD player device may read the UDF table to identify the location on the DVD when the VTS_01_2.VOB file is requested. The buffer may be included on the disc or into the disc image by assigning the beginning locations of the files to be offset by the desired number of sectors. While the examples herein primarily reference a UDF file system 200, any other file system may also suitably be used. For example, the ISO 9660 file system may be used in place of a UDF file system 200.

While many of the examples of the technology described herein are directed to the context of DVD video, the technology may be applied to a wide variety of other electronic storage contexts outside of DVD video. For example, video data may be stored on other types of optical discs, on solid state drives, flash memory, or any other suitable technology used for storage of data. Where examples of the present technology are primarily directed toward use with an optical disc where video data is stored on multiple layers of the optical disc, the present technology may also be used, for example, to store video data across multiple storage devices.

Figures 3A, 3B:
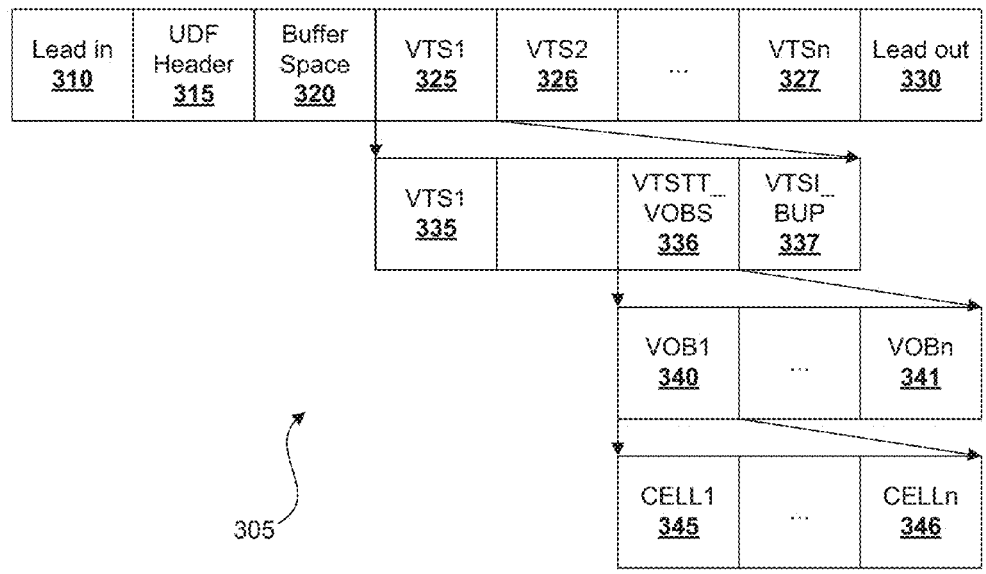
FIGS. 3a-3b are block diagrams of a structure of a DVD layout including a buffer space in accordance with an example of the present technology.

Referring to FIG. 3*a*, an example optical disc organization 305 is shown illustrating the positioning of the buffer space 320 after the UDF Header 315 and before the data files 325-327 (including 335-346). FIG. 3 illustrates a lead-in 310 and lead-out 330 portion of the optical disc. The lead-in area 310 indicates the starting part of a DVD session and the lead-out area 330 indicates the ending part of a DVD session. FIG. 3 further illustrates some of the structure of components of the DVD (i.e., the cells 345-346 within a VOB 340-341, VOBs 340-341 within VTSTT_VOB 336 and VTS* files 335-337 within VTS1 325). FIG. 3*a* is simplified for illustration purposes and does not illustrate, for example, a Video Manager (VMG), VOBUs within cells, and so forth and is not intended to be limiting. Other figures may be similarly simplified and no limitation is intended thereby.

While FIG. 3*a* illustrates the buffer space 320 as being positioned after the UDF Header 315 and before VTS1 325, the buffer space 320 may optionally be inserted before the UDF Header 315, or after or in one or more of the Video Title Sets (VTS) 325-327. In one aspect, the buffer space 320 may be positioned towards a middle or end portion of a first layer of the optical disc. In another aspect, the buffer space 320 may be split into multiple sub-buffers 321-322 which are positioned between multiple different VOBs or VTSs 325-327 on the first layer, for example, as in FIG. 3*b*. When positioning the buffer space 320 or sub-buffers 321-322 at one or more locations other than at or near a beginning of the first layer of the optical disc, the buffer space 320 or sub-buffers 321-322 may be placed at locations which satisfy one or more of the criteria for suitable layer breaks. For example, the buffer space or sub-buffers 321-322 may be placed at non-seamless cell boundaries at the beginning of files with filenames ending in "_0" or "_1".

Figure 4:
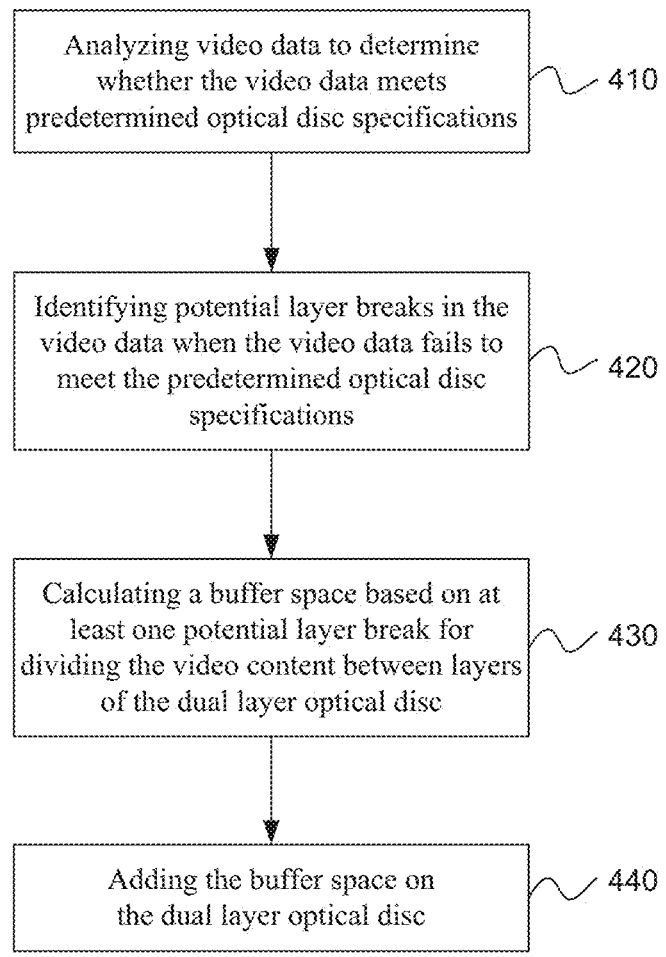
FIGS. 4-5 are flow diagrams of methods of organizing video data in accordance with examples of the present technology.

Referring to FIG. 4, a flow diagram of a method for organizing dual layer optical disc data is illustrated in accordance with an example of the present technology. The method may include analyzing 410 video data to determine whether the video data meets predetermined optical disc specifications for organization on a dual layer optical disc. Potential layer breaks in the video data may be identified 420 using the processor based on whether the video data meets the predetermined optical disc specifications. If the video data meets the predetermined optical disc specifications, the video data may be recorded to the dual layer optical disc or to an image of a dual layer optical disc. When the video data fails to meet the predetermined optical disc specifications and one or more potential layer breaks are identified, a buffer space including a number of sectors based on the one or more potential layer breaks may be calculated 430 for dividing the video content between layers of the dual layer optical disc. The buffer space may then be prepared for application 440 onto the dual layer optical disc. For example, the buffer space may be recorded near a beginning of a layer of the dual layer optical disc, or rather may be created by assigning sector locations of the optical disc content such that the optical disc content is offset from a beginning of a first layer of the dual layer optical disc. In one aspect, the number of sectors comprising the buffer space may remain blank or unrecorded. In another aspect, which will be described in further detail later, the buffer space may include data which is not identified in the file system and which may be hidden from most DVD players and/or systems.

Figure 5:
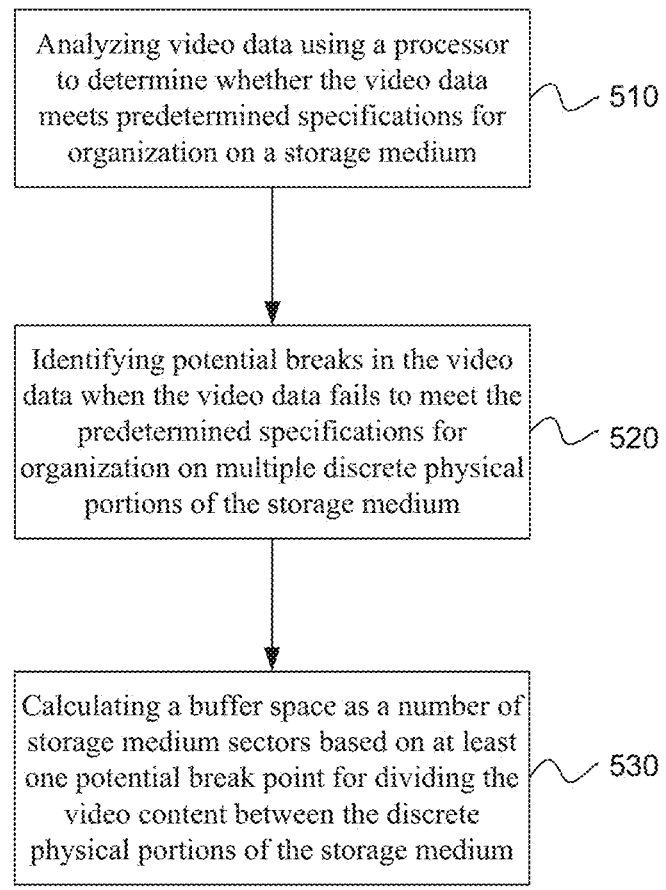

Referring to FIG. 5, a flow diagram of a method for organizing dual layer optical disc data is illustrated in accordance with an example of the present technology. The method of FIG. 5 is similar in many regards to the method of FIG. 4. The method may enable organization of video data across multiple storage devices or multiple layers, locations, substrates, or the like of a same storage device, such as an optical disc. Video data may be analyzed 510 to determine whether the video data already meets specifications for organization on storage media. When the video data fails to meet the specifications, potential breaks in the video data may be identified 520 for organizing the video data on discrete physical portions of the storage medium. A buffer space may be calculated 530 based on an identified potential break for spacing the video content around the potential break to meet the data organization specifications, or rather for dividing the video content between discrete physical portions of the storage medium/media.

The method may further include recording the video data onto a disc image including the buffer space. The method may include recording the video data onto the storage medium to include the buffer space with the video data. Where multiple potential break points are identified and the buffer space is not inserted near a beginning of the first layer or first area of the storage medium, the method may include inserting the buffer space at one of the potential break points which is ultimately not selected for use as an actual break point because the potential break point will be at a non-seamless cell boundary and the buffer space inclusion may be unnoticeable during video playback. Whether near a beginning of the first layer or area of the storage medium or elsewhere, the buffer may be created or included by identifying and assigning sector locations for the beginning of files comprising the video data such that a space is created through assignment of the files around the desired location of the buffer. The identification and assignment may include assigning sector locations of the video data such that files comprising the video data are offset from a beginning of the first layer or first area of the storage medium.

In analyzing the video data to determine whether the video data meets predetermined specifications, the method may include determining whether the video data meets the following specifications or at least a subset of the following specifications:

more data is stored on the first layer than the second layer;
the first and second layers each include 4.7 gigabytes or less data;
the first layer includes at least 14,080 more sectors of data than the second layer;
the potential break point is at a beginning of a VOB, IFO or BUP file;
the potential break point is at a file including a "_0" or "_1" designation;
the potential layer break is at a file starting at a sector numbered as a multiple of 16; and
a potential break point is at a non-seamless cell boundary.

In a more specific example, a determination may be as to whether: the first layer is larger (or includes more data) than the second layer by at least 14,080 sectors; the potential layer break is on a sector that is a multiple of 16; each of the layers contain less than 4.7 GB of data; and at least one of: whether the potential layer break is on a non-seamless cell boundary or whether the potential layer break is at a beginning of an IFO, BUP, or _0 or _1 VOB file.

A size or number of sectors of the buffer space may be calculated based on the analysis of the video data in light of one or more of the above-listed specifications. The method may include a preference or bias for a layer break at a beginning of a file rather than at a cell boundary—which may or may not be at a beginning of the file. The method may include laying out DVD data files in a same order as exists prior to insertion of the buffer with the difference being the inclusion of the buffer at a location on the first layer. The method may also include a bias for potential layer breaks which result in a smallest or least amount of padding in the buffer space. In other words, a buffer space of approximately 5,000 sectors, for example, may be selected over a potential break point that results in a buffer space of approximately 15,000 sectors.

When the storage medium comprises an optical disc with three or more writable layers, the method may further apply the analysis of the layers to the second, third, and any other layers of the optical disc. Potential layer breaks in the second layer may be identified for breaking or dividing data between the second and third layers, and a buffer space for inclusion in the second layer may be calculated and inserted. Similarly, identification of layer breaks, calculation of buffer space, and so forth may be performed for any layers numbered up to n−1 where n represents the total number of layers in the optical disc.

Although in many instances the buffer space may comprise blank or unrecorded sectors of the optical disc, the buffer space may alternatively include data. Because the file system points to locations of video data around the buffer space without identifying the buffer space, and pointers to the buffer space may not be created, a standard optical disc player may not recognize the presence of the buffer space or any data which may be stored therein. Virtually any form of data may be included in the buffer space. Some non-limiting examples of the data to be included in the buffer space may include documents, images, video data, audio data, dummy or random data and so forth. In a specific example, the buffer space data may include identification information, such as when and where the DVD image was created, a name of the employee who created or requested creation of the image, a name of the company the created and/or distributed the image, information regarding an original source of the video data, information describing the modification process (e.g., steps taken, buffer size created, errors encountered, software version used, and so forth), or any other data which may be useful for tracking down an origin of a disc, identifying and resolving issues with a disc image and so forth.

Because the buffer space and any data therein is not identified by the UDF header, a common DVD player may be unable to recognize the buffer space or read any data contained therein. Vendors, studios, or others may have a specialized DVD player or be provided with software which is designed to identify the buffer space and any data therein. For example, software may be used to read out sectors of an optical disc regardless of whether a UDF file system header indicates the presence of any data at one or more sectors. As another example, the buffer space size may be calculated to include the buffer space data at one or more predetermined specific sector numbers. Thus, as an additional specification, potential layer breaks may be selected and video data files positioned to ensure that one or more of the predetermined sector numbers are available for writing at least a minimal amount of buffer space data.

In one aspect, a potential layer break may be selected to result in sufficiently large buffer space to accommodate a known amount of the buffer space data to be stored in the buffer space, while optionally selecting a smallest of the potential layer breaks meeting predetermined specifications and providing the sufficiently large buffer space. In other words, when selecting between multiple potential layer breaks, the list of available potential layer breaks may be narrowed by selecting potential layer breaks which will allow a sufficiently large buffer space to accommodate the desired buffer space data. Further, where multiple potential layer breaks accommodate the desired amount of buffer space data, a potential layer break can be selected which results in a smaller buffer space than another potential layer break which results in a larger buffer space.

Figure 6:
FIG. 6 is an illustration of a network page for purchasing DVDs to be created on demand in accordance with an example of the present technology.

Reference will now be made to FIG. 6. As part of a video rental/sale service, a merchant may wish to implement instant download video and/or Disc on Demand services. Customers may wish to utilize the instant download video and/or Disc on Demand services for particular videos, but because some dual layer content from vendors may not fit specifications for DVD Download discs some videos may not be readily available for instant download video and/or Disc on Demand services. The present technology may enable modification of dual layer content from vendors to allow the dual layer content to be recorded to dual layer DVD Download images or discs without requesting reauthoring from the vendor.

FIG. 6 illustrates a content or network page 605 for an electronic retailer. The content page may include, for example, search results 640, sorting options 615 for sorting the search results, a search query input box 630, a shopping cart 635, customer account 610 information, related search information and so forth. In one aspect, the network page 605 may display one or more video titles 645 available for purchase or rental.

Where select video titles are unavailable for Disc on Demand services, the network page 605 may indicate to the customer for which titles the Disc on Demand service 650 is available. When the customer purchases an eligible DVD or Blu-ray optical disc and the order has been completed, an instant video version of the applicable title may be added to the customer's video library for instant download. In one example, the instant video may be downloaded as a DVD Download disc image to enable the customer to record the image to a dual layer DVD-R. In another aspect, the network page 605 may be in communication with a fulfillment system for fulfilling orders using the Disc on Demand service 650. For instance, the fulfillment system may retrieve stored CD, DVD, Blu-ray, or other multi-layer optical disc data to burn an optical disc with the disc image, print associated materials, prepare the associated packaging, and ship the purchased video title with packaging as a DVD Download disc which may appear substantially indistinguishable to the average customer from a factory-stamped DVD-ROM. The system may enable the DVD Download disc image to be available via the customer account 610 for on-demand downloading and recording within suitable copy protection restraints to minimize piracy.

A video title 645 may be available in multiple formats, such as for providing a different quality or definition of video content. More specifically, a same video title 645 may be available, for example, in high definition and standard definition formats. The vendor of the video title 645 may authorize the electronic retailer to create standard or high definition versions of the video title 645 based on high definition or standard definition formats respectively provided to the retailer, using methods such as down-sampling, up-sampling and so forth. In such an example, the technology may be applied to an original dual layer video content to modify the dual layer content to fit a DVD Download disc, and the technology may be subsequently applied to an up/down-sampled version of the dual layer video content to modify the up/down-sampled version to fit a DVD Download disc. Accordingly, the technology may be used to modify/organize/arrange video data from sources other than an original stamped DVD-ROM to create DVD Download discs.

As illustrated in FIG. 6, some of the video titles 645 may be not yet available for Disc on Demand services 650. The network page 605 may be in communication with an order tracking module configured to track orders of video titles 645. Disc on Demand request rules may be provided for determining whether to submit a request to create a Disc on Demand for a particular title. For example, a rule may permit the creation of a Disc on Demand version 650 of a video title 645 when sales of the video title fall below a predetermined threshold so that the electronic retailer may use warehouse space for products unavailable for on-demand services or which are at least ordered more frequently than the infrequently ordered video title.

Some benefits of Disc on Demand technologies include increased availability of a broader catalog of titles (i.e., no more "out-of-stock" products), content and artwork does not become obsolete, investment in inventory and fulfillment is reduced, order flow/processing is not affected, and on-demand purchases may be personalized for each customer.

Figure 7:
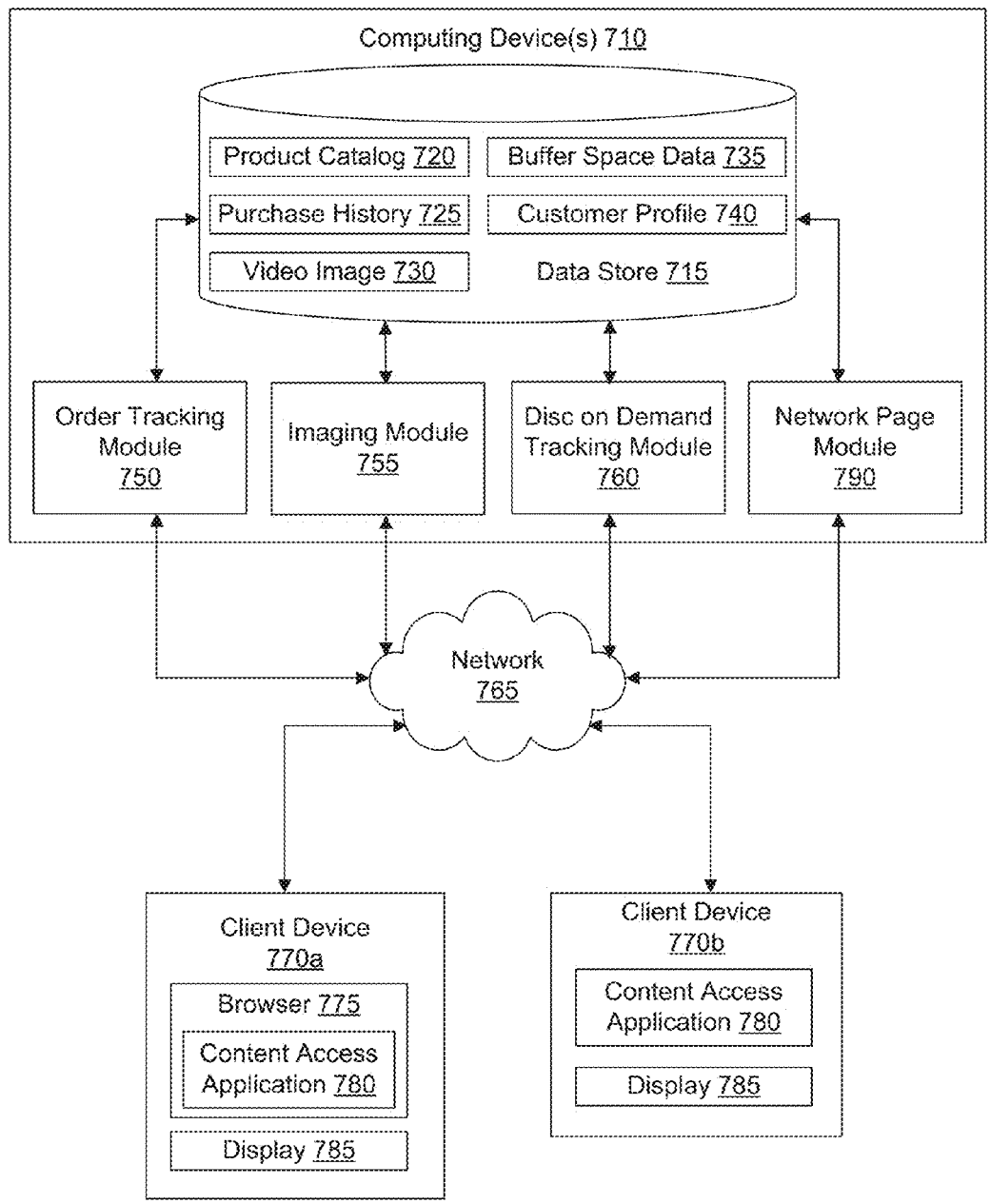
FIG. 7 is a block diagram of a system for fulfillment of video purchases in accordance with an example of the present technology.

Referring to FIG. 7, a block diagram of a Disc on Demand system is illustrated. The system may be implemented across one or more computing device(s) 710, 770*a-b* connected via a network 765. For example, a computing device 710 may include a data store 715 and various modules such as an order tracking module 750, a DVD Download imaging module (or simply "imaging module") 755, a Disc on Demand tracking module 760 and a network page module 790 executable by a processor of the computing device 710. The data store 715 may include multiple data stores for storing a product catalog 720, a purchase history 725 of a customer, DVD Download images (or simply "video images") 730, buffer space data 735 and so forth. The data store 715 may also include other data stores for storing customer profile data 740 and so forth, as will be apparent from the present description.

The network page module 790 may provide a network page for display, such as may be part of an electronic store. In the case of a retail store website, the network page may be a home page, a product search page, a product page or the like. The network page module 790 may enable input from a user for navigating network pages, searching for products, purchasing products and so forth. The network page module 790 may provide pages for display which include product information via the product catalog data store 720, Disc on Demand availability via the Disc on Demand tracking module 760 and so forth.

The purchase history data store 725 may be available to store a video title purchase history of a user, including availability of instant download video and/or on-demand video titles for downloading, recording and so forth based on prior purchases by the customer.

The system may include an order tracking module 750 for tracking purchases of video titles and storing the tracked information in the purchase history data store 725. Data obtained using the order tracking module 750 may be used, at least in part, to determine whether to create a DVD Download image for a particular title. If the DVD Download image is stored after creation, creation of the image a second time may be avoided when another purchase of the video title is made.

The Disc on Demand tracking module 760 may analyze the data obtained using the order tracking module 750 to determine whether to create a DVD Download image for a particular title. For example, when a total number of orders within a specified time period or over successive time period intervals for a particular video title fall below a predetermined threshold the Disc on Demand tracking module 760 may request the imaging module 755 to create an image of the video title. Also, when an order for a video title with an existing DVD Download image is received, the imaging module 755 may access the DVD Download image from the video image data store 730. The DVD Download image may include a buffer space for organization of the video data in accordance with DVD Download standards, and may cause the DVD Download image to be burned to a dual layer DVD-R with CSS to be shipped to the purchaser. In other words, the imaging module 755 may be a part of a fulfillment system for fulfilling an order by providing a DVD image for download and/or for creating a physical DVD based on a stored DVD image for physical shipment to the purchaser.

The Disc on Demand tracking module 760 may also track which video titles are available for Disc on Demand services and may compare the available video titles with video titles included in a product database. When the Disc on Demand tracking module identifies a Disc on Demand title not indicated as available for Disc on Demand in the product catalog data store 720, the Disc on Demand tracking module may update the product catalog data store 720 such that the network page module, which retrieves product data from the product catalog data store 720, may display accurate Disc on Demand availability as well as accurate fulfillment information on the network page. For example, fulfillment times and locations may vary depending on whether the DVD is being created on-demand at a DVD creation facility or being supplied from an existing supply in a warehouse location.

The system may also include the buffer space data store 735 for storing data to be included in the buffer space of the DVD Download image, as has been described previously.

The network page module 790 may be configured to provide pages for display with any suitable technology incorporated therein, such as the ability to sort information displayed on the page, the ability to modify the page to accommodate various devices accessing the page, and so forth. Thus, regarding the network page module 790, as well as any other module described herein, the capabilities, features and functionality of the module are not limited to the description provided and may encompass a broad variety of other capabilities, features and functionality not described.

The system may be configured to receive a search query from a user or other navigation instructions for navigating to a network page. A network page provided for display by the network page module 790 may include a search query box, navigation options and/or search refinements for viewing products by department, product manufacturer, price category and so forth. The system may receive the search query via the search query box or by audio instructions or the like. The system may receive other navigation instructions as a result of user interaction with search refinements or other network page features. The system may generate product results in response to a search query, as may be performed by any of a variety of existing search engines, or may provide product results for display to a user for purchase in response to navigation on a website.

The network page module 790 may access data in the product catalog data store 720 for providing search results, product information and other network page data for display on the client device 770. The product catalog data store 720 may include, for example, the products available for purchase from an online retailer. The product catalog data store 720 may include text, images, video and so forth, and may be structured for suitable display on a client device 770, such as in the form of a webpage or website. In particular, the product catalog data store 720 may include data related to video products.

The modules that have been described may be stored on, accessed by, accessed through, or executed by a computing device 710. The computing device 710 may comprise, for example, a server computer or any other system providing computing capability. Alternatively, a plurality of computing devices may be employed that are arranged, for example, in one or more server banks, blade servers or other arrangements. For example, a plurality of computing devices together may comprise a cloud computing resource, a grid computing resource, and/or any other distributed computing arrangement. Such computing devices may be located in a single installation or may be distributed among many different geographical locations. For purposes of convenience, the computing device 710 is referred to herein in the singular form. Even though the computing device 710 is referred to in the singular form, however, it is understood that a plurality of computing devices may be employed in the various arrangements described above.

Various applications and/or other functionality may be executed in the computing device 710 according to various embodiments, which applications and/or functionality may be represented at least in part by the modules that have been described. Also, various data may be stored in a data store 715 that is accessible to the computing device 710. The data store 715 may be representative of a plurality of data stores as may be appreciated. The data stored in the data store 715, for example, is associated with the operation of the various applications and/or functional entities described. The components executed on the computing device 710 may include the modules described, as well as various other applications, services, processes, systems, engines or functionality not discussed in detail herein.

The term "data store" 715 may refer to any device or combination of devices capable of storing, accessing, organizing and/or retrieving data, which may include any combination and number of data servers, relational databases, object oriented databases, simple web storage systems, cloud storage systems, data storage devices, data warehouses, flat files and data storage configuration in any centralized, distributed or clustered environment. The storage system components of the data store may include storage systems such as a SAN (Storage Area Network), cloud storage network, volatile or non-volatile RAM, optical media or hard-drive type media.

The client devices shown in FIG. 7 are representative of a plurality of client devices that may be coupled to the network. The client devices may communicate with the computing device over any appropriate network, including an intranet, the Internet, a cellular network, a local area network (LAN), a wide area network (WAN), a wireless data network or a similar network or combination of networks.

Each client device 770 may be embodied, for example in the form of a client computer, a desktop computer, a laptop computer, a mobile device, a hand held messaging device, a set-top box, heads up display (HUD) glasses, a car navigation system, personal digital assistants, cellular telephones, smart phones, set-top boxes, network-enabled televisions, music players, web pads, tablet computer systems, game consoles, electronic book readers or other devices with like capability, including capabilities of receiving and presenting content from a server. Each client device 770 may include a respective display 785. The display 785 may comprise, for example, one or more devices such as cathode ray tubes (CRTs), liquid crystal display (LCD) screens, gas plasma based flat panel displays, LCD projectors, or other types of display devices, etc.

Each client device 770 may be configured to execute various applications such as a browser 775, a respective page or content access application 780 for an online retail store and/or other applications. The browser 775 may be executed in a client device 770, for example, to access and render network pages, such as web pages or other network content served up by the computing device 710 and/or other servers. The content access application is executed to obtain and render for display content features from the server or computing device 710, or other services and/or local storage media.

In some embodiments, the content access application 780 may correspond to code that is executed in the browser 775 or plug-ins to the browser 775. In other embodiments, the content access application 780 may correspond to a standalone application, such as a mobile application. The client device 770 may be configured to execute applications beyond those mentioned above, such as, for example, mobile applications, email applications, instant message applications and/or other applications. Users at client devices 770 may access content features through content display devices or through content access applications 780 executed in the client devices 770.

Although a specific structure may be described herein that defines server-side roles (e.g., of content delivery service) and client-side roles (e.g., of the content access application), it is understood that various functions may be performed at the server side or the client side.

Certain processing modules may be discussed in connection with this technology. In one example configuration, a module may be considered a service with one or more processes executing on a server or other computer hardware. Such services may be centrally hosted functionality or a service application that may receive requests and provide output to other services or customer devices. For example, modules providing services may be considered on-demand computing that is hosted in a server, cloud, grid or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

Figure 8:
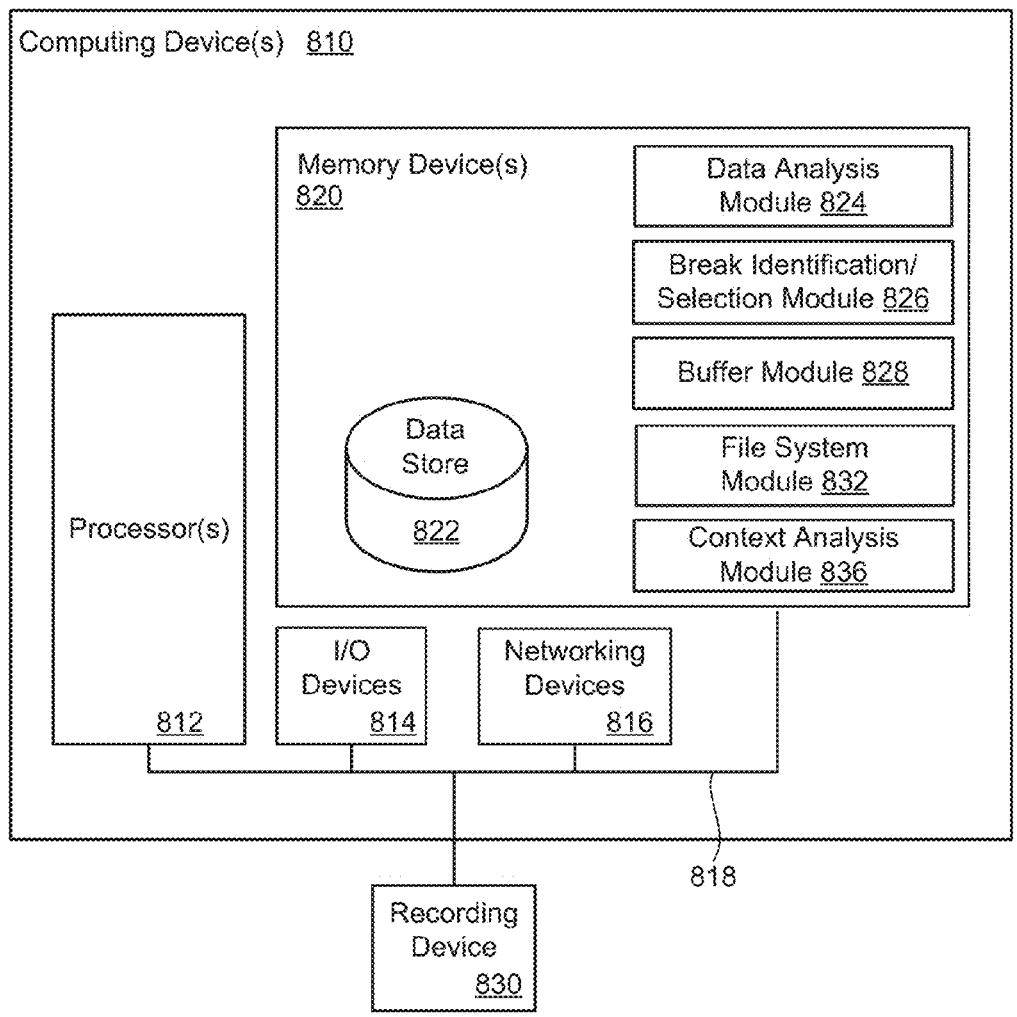
FIG. 8 is block diagram illustrating an example of a computing device for video data organization in accordance with an example of the present technology.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device 810 may include a local communication interface 818 for the components in the computing device. For example, the local communication interface 818 may be a local data bus and/or any related address or control busses as may be desired.

The memory device 820 may contain modules that are executable by the processor(s) and data for the modules. Located in the memory device 820 are modules executable by the processor. For example, a data analysis module 824, a break identification module and/or break selection module 826, a buffer module 828, a context analysis module 836 and a file system module 832, as well as other modules, may be located in the memory device. A data store 822 may also be located in the memory device 820 for storing data related to the modules and other applications along with an operating system that is executable by the processor(s) 812.

The computing system 810 of FIG. 8 may be utilized for organizing video content. For example, the data analysis module 824 may analyze video data using the processor 812 to determine whether the video data meets predetermined specifications for organization on a storage medium such as a multi-layer optical disc. The break identification module 826 may identify potential break points in the video data when the video data fails to meet the predetermined specifications. The break selection module 826 may select a potential break point in the video data based on a predetermined set of rules. For example, the rules may stipulate that the break point be selected at a beginning of a file, that a potential break point resulting in a smaller buffer space be selected, and so forth. Some other non-limiting examples of rules include: more data is to be stored on a first layer than a second layer; the first and second layers each include 4.7 gigabytes or less data; the first layer includes greater than 14,000 sectors; the potential break point is at a beginning of a VOB, IFO or BUP file; the potential break point is at a file including a "_0" or "_1" designation; and a potential break point is at a non-seamless cell boundary. The buffer module 828 may calculate the buffer space based on the potential break point selected using the break selection module 826. In one aspect, the buffer module 828 may calculate the buffer space to position a beginning of a data file at a cell numbered as a multiple of 16.

In some examples, the break identification/selection module 826 may identify multiple potential break points which may each satisfy at least a minimum number or a subset of the predetermined set of rules. When multiple potential break points have been identified the buffer module 828 may determine which of the multiple potential break points to use for calculating the buffer space. For example, the buffer module 828 may select a break point which results in a smallest buffer space, a break point which accommodates hidden data to be stored in the buffer space and so forth.

When multiple potential break points are identified, the context analysis module 836 may be used to analyze a context of the video data at the potential break points. Video content often includes changing scenes, music, and so forth. Some video content may include rapidly changing imagery, bright colors, moving audio and so forth. However, insertion of a layer break into video data including changing imagery, bright colors, moving audio and the like may result in a more noticeable break in playback of video data between layers of the optical disc. Video scenes including black or dark image data, substantially still video scenes and video scenes with minimal audio or with minimal change in audio data may be selected for positioning of a layer break over scenes with the rapidly changing imagery, bright colors, moving audio and so forth to minimize noticeability of the transition between layers across the layer break. The context analysis module 836 may decode the video data at the potential layer breaks to analyze the imagery, audio and so forth of video data at identified potential break points to determine which potential break point is likely to be less noticeable than other potential break points. The buffer module 828 may use the determination of least likely to be noticeable break points to calculate and insert the buffer space.

The computing device 810 may further include or be in communication with a recording device 830. When the video data is to be recorded to a dual layer DVD, the recording device 830 may be configured to record the video data onto the dual layer DVD (including the calculated buffer space). The recording device 830 may be any suitable recording device 830 for the type of medium onto which the video data is to be recorded.

The computing device 810 may include a file system module 832. The file system module 832 may be used to create a file system table for inclusion on the storage medium. In this example, the buffer space may be a number of sectors defined by assignment of file locations at sectors beginning after the number of sectors for the buffer space. The computing device may apply CSS during burning of an optical disc to secure the video data to minimize copying of the video content.

In a specific example, one or more of the modules may be a part of a DVD burning engine. The buffer module 828 may comprise a software program configured to parse the DVD-ROM image to determine or calculate the appropriate buffer space size. For example, the software program may be written in Java, C++, Python or any other suitable programming language, including web-application programming languages.

While many of the examples described herein relate to single-sided dual layer DVD-R DVD Download discs, the present technology may be applied to other types of storage media as well. For example, content may be organized across more than two layers of a single optical disc. Content may be organized on DVD+R or DVD+/−RW discs as well.

Content may be organized across layers of double-sided optical discs. For example, rather than splitting video content across multiple layers of a single sided disc, the content may be split among single layers of a multiple sided disc. Also, video data on multiple layers of multiple sides of the disc may be considered in determining potential break points such that the video content is suitably arranged on each of the layers to meet the DVD Download specifications and to fit the video content onto the available layers. In other words, the present technology may modify and organize video content for arrangement across multiple storage devices and/or storage areas which do not commonly enable a continual, uninterrupted playback.

Accordingly, the present technology is not necessarily limited to DVD Download specifications since the technology may be used to organize video data on a number of DVD and other optical disc types or even on non-optical disc-type storage devices. In some configurations, the technology may be used where a single file system is available to list files and locations for multiple storage layers, storage areas or storage devices, which may be discrete. For example, RAID 0 is a file system protocol which enables the use of multiple storage devices which appear as a single device and which share a same file system.

Various applications may be stored in the memory device 820 and may be executable by the processor(s) 812. Components or modules discussed in this description that may be implemented in the form of software using high programming level languages that are compiled, interpreted or executed using a hybrid of the methods.

The computing device 810 may also have access to I/O (input/output) devices 814 that are usable by the computing devices. An example of an I/O device 814 is a display screen that is available to display output from the computing devices. Other known I/O device may be used with the computing device as desired. Networking devices 816 and similar communication devices may be included in the computing device 810. The networking devices 816 may be wired or wireless networking devices 816 that connect to the internet, a LAN, WAN, or other computing network.

The components or modules that are shown as being stored in the memory device 820 may be executed by the processor 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor 812. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory 820 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A method of organizing dual layer optical disc data, comprising:
   analyzing video data using a processor to determine whether the video data meets predetermined optical disc specifications for organization on a dual layer optical disc;
   identifying potential layer breaks in the video data using the processor to meet the predetermined optical disc specifications;
   calculating a buffer space and a buffer space size to include buffer space data, the buffer space comprising a number of sectors based on at least one potential layer break for dividing the video data between layers of the dual layer optical disc;
   selecting the at least one potential layer break that accommodates a buffer space sized to contain the buffer space data while resulting in a smaller calculated buffer space as compared to an alternative potential layer break; and
   adding the buffer space to the video data.

2. The method as in claim 1, wherein adding the buffer space further comprises recording the buffer space near a beginning of a layer of the dual layer optical disc.

3. The method as in claim 1, wherein adding the buffer space further comprises assigning sector locations of the video data such that the video data is offset from a beginning of a first layer of the dual layer optical disc.

4. The method as in claim 1, wherein adding the buffer space further comprises assigning sector locations of the video data such that the number of sectors in the buffer space of the dual layer optical disc remain blank.

5. A method of organizing video data, comprising:
   analyzing video data using a processor to determine whether the video data meets predetermined specifications for organization on a storage media;
   identifying potential breaks in the video data using the processor to meet the predetermined specifications for organization on multiple discrete physical portions of the storage media;
   calculating a buffer space as a number of storage medium sectors based on a potential break point for dividing the video data between the discrete physical portions of the storage medium and calculating a buffer space size to include buffer space data; and
   selecting the potential break point that accommodates a buffer space sized to contain the buffers space data while resulting in a smaller calculated buffer space as compared to an alternative potential break point.

6. The method as in claim 5, further comprising recording the video data onto the storage media to include the buffer space with the video data and to shift the potential break point to meet the predetermined specifications.

7. The method as in claim 6, wherein recording the video data comprises recording a file system onto the storage media that identifies the beginning of files of the video data and includes the buffer space near a beginning of a first layer of the storage media.

8. The method as in claim 6, wherein recording the video data comprises assigning sector locations of the video data such that files comprising the video data are offset from a beginning of a first layer of the dual layer optical disc.

9. The method as in claim 6, wherein recording the video data comprises recording to the storage media such that the buffer space includes null or empty storage media sectors.

10. The method as in claim 5, wherein identifying the potential breaks includes determining whether the video data meets the predetermined specifications including: storing at least a predetermined amount more of data on a first layer than a second layer, wherein the first and second layers each include 4.7 gigabytes or less data; and ensuring the potential break is at a beginning of a VOB, IFO or BUP file including a "_0" or "_1" designation located at a non-seamless cell boundary.

11. The method as in claim 5, further comprising identifying data to include in the buffer space to remain unidentified by a file system of the storage medium.

12. A system for organizing video data, comprising:
   a data analysis module to analyze video data using a processor to determine whether the video data meets predetermined specifications for organization on a storage medium;
   a break identification module to identify potential break points in the video data when the data analysis module indicates the video data fails to meet the predetermined specifications;
   a break selection module to select a potential break point identified in the video data using the break identification module based on a predetermined set of rules; and
   a buffer module to calculate a buffer space based on the potential break point selected and a buffer space size to include buffer space data, using the break selection module, wherein the selected potential break point accommodates a buffer space sized to contain the buffer space data and allows a smaller calculated buffer space as compared to an alternative potential layer break.

13. The system of claim 12, further comprising a recording device configured to record the video data onto the storage medium including the calculated buffer space.

14. The system of claim 12, wherein the storage medium comprises a multi-layer optical disc.

15. The system of claim 12, wherein the predetermined set of rules includes:
more data is stored on a first layer than a second layer;
the first and second layers each include 4.7 gigabytes or less data;
the first layer includes at least 14,080 more sectors of data than the second layer;
the potential break point is at a beginning of a VOB, IFO or BUP file;
the potential break point is at a file including a "_0" or "_1" designation; and
a potential break point is at a non-seamless cell boundary.

16. The system of claim 12, wherein the buffer space is calculated to position a beginning of a data file for the potential break point at a sector numbered as a multiple of 16.

17. The system of claim 16, wherein buffer module is configured to determine which of the potential break points results in a smallest buffer space and positions the beginning of the data file at the sector numbered as the multiple of 16.

18. The system of claim 12, further comprising a file system module configured to create a file system table for inclusion on the storage media, wherein the buffer space is defined by assignment of file locations at sectors beginning after the number of sectors calculated for the buffer space.

19. The system of claim 12, further comprising a context analysis module configured to analyze a context of the potential break points to determine which of the potential break points includes one or more criteria selected from the group consisting of:
a video scene including black or dark image data;
a substantially still video scene; and
no audio or change in audio data.

20. A system for video data imaging, comprising:
a network page module for displaying a video title available for purchase;
an imaging module for creating an image of the video title including a buffer to offset video data in the video title for organization on discrete areas of a storage medium using a processor, the buffer being a smaller calculated buffer space for the offset while having a buffer space size sized to accommodate buffer space data;
a break identification module to identify potential break points in the video data when the video data fails to meet the predetermined specifications;
a break selection module to select at least one potential break point identified in the video data using the break identification module based on a predetermined set of rules; wherein the selected potential break point accommodates the buffer space sized to contain the buffer space data while resulting in the smaller calculated buffer space as compared to an alternative potential layer break;
a video image data store for storing the image of the video title; and
a fulfillment system for providing the image of the video title from the video image data store upon purchase.

21. The system of claim 20, wherein the fulfillment system provides the image for download.

22. The system of claim 20, wherein the fulfillment system records the image to an optical disc.

23. The system of claim 20, further comprising a buffer space data store for storing data to be included in the buffer without identification by a file system of the storage medium.

24. The system of claim 20, further comprising a tracking module for requesting the imaging module to create the image when purchases of the video title fall below a predetermined threshold.

* * * * *